United States Patent [19]

Phillips

[11] 4,297,262
[45] * Oct. 27, 1981

[54] POLYVINYL BUTYRAL PLASTICIZED WITH TETRAETHYLENEGLYCOL DI-N-HEPTANOATE

[75] Inventor: Thomas R. Phillips, Belpre, Ohio

[73] Assignee: E. I. Du Pont de Nemours and Company, Wilmington, Del.

[*] Notice: The portion of the term of this patent subsequent to Oct. 28, 1997, has been disclaimed.

[21] Appl. No.: 71,537

[22] Filed: Aug. 31, 1979

[51] Int. Cl.³ ............................................. C08K 5/10
[52] U.S. Cl. .................................................. 260/31.6
[58] Field of Search ...................................... 260/31.6

[56] References Cited

U.S. PATENT DOCUMENTS

| | | | |
|---|---|---|---|
| 1,970,578 | 8/1934 | Schoeller et al. | 260/31.6 |
| 2,045,130 | 6/1936 | Fix | 260/431 R |
| 2,202,160 | 5/1940 | Marks | 260/431 R |
| 2,229,222 | 1/1941 | Reid | 560/263 |
| 2,274,672 | 3/1942 | Dennison | 260/431 R |
| 2,306,315 | 12/1942 | Lycan | 260/33.4 |
| 2,340,482 | 2/1944 | Lycan | 260/31.6 |
| 2,412,469 | 12/1946 | Nicholl et al. | 260/488 |
| 2,453,569 | 11/1948 | Debacher | 260/31.6 |
| 2,739,080 | 3/1956 | Woodworth | 260/31.6 |
| 2,864,784 | 12/1958 | Marks | 260/31.6 |
| 3,178,334 | 4/1965 | Bragaw, Jr. et al. | 428/437 |
| 3,296,211 | 1/1967 | Winkler et al. | 260/30.6 R |
| 3,361,565 | 1/1968 | Umberger | 96/74 |
| 3,384,532 | 5/1968 | Martins et al. | 8/430 |
| 3,525,703 | 8/1970 | Iwami et al. | 260/5 |
| 3,578,621 | 5/1971 | Stapfer | 260/31.8 R |
| 3,841,955 | 10/1974 | Croaker et al. | 260/30.6 R |
| 4,055,430 | 10/1977 | Hasegawa et al. | 430/340 |

Primary Examiner—Joseph L. Schofer
Assistant Examiner—Peter F. Kulkosky

[57] ABSTRACT

Polyvinyl butyral plasticized with tetraethyleneglycol di-n-heptanoate.

5 Claims, 1 Drawing Figure

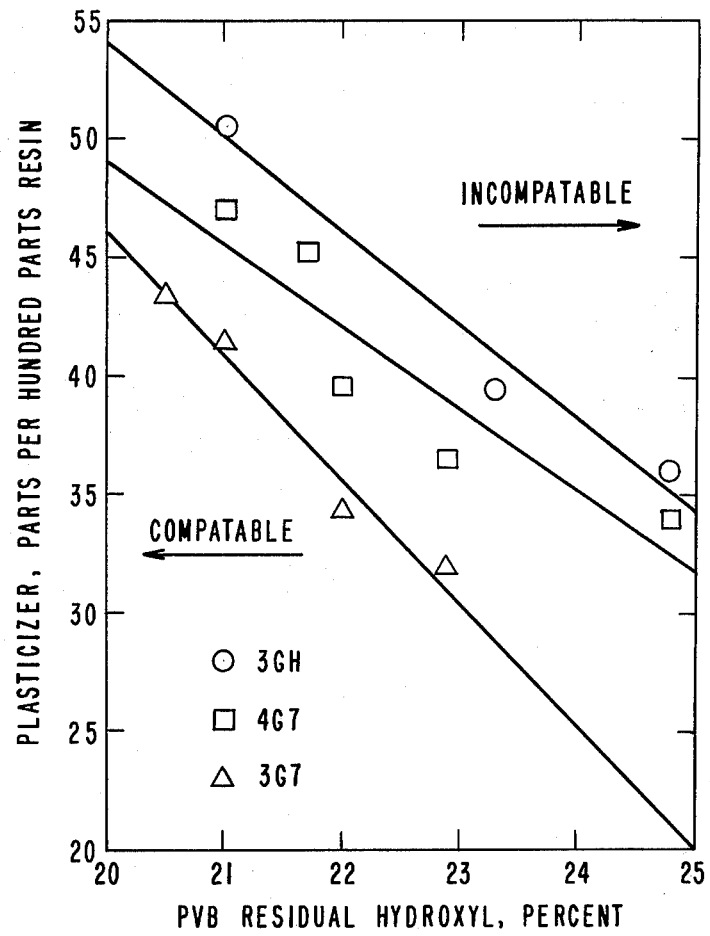

POLYVINYL BUTYRAL PLASTICIZED WITH TETRAETHYLENEGLYCOL DI-N-HEPTANOATE

CROSS REFERENCE TO RELATED APPLICATIONS

This application is related in subject matter to Phillips U.S. Pat. No. 4,230,771, issued Oct. 28, 1980 and copending application Ser. No. 71,536, filed Aug. 31, 1979.

BACKGROUND OF THE INVENTION

Polyvinyl butyral is widely used in combination with one or more layers of glass to provide a composite which is resistant to shattering. The polyvinyl butyral typically contains a plasticizer to provide a balance of mechanical properties satisfactory for subsequent handling and performance requirements. It has been found that while certain plasticizers perform satisfactorily in combination with polyvinyl butyral, high concentrations of the plasticizer are generally necessary for satisfactory handling characteristics. In addition, many known plasticizers are incompatible with polyvinyl butyral outside of limited ranges of hydroxyl content.

The instant invention provides a plastic composition comprising polyvinyl butyral and, in compatible admixture therewith, a plasticizer comprising at least about 10 weight percent tetraethyleneglycol di-n-heptanoate of the general formula

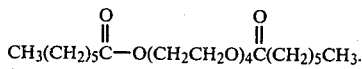

SUMMARY OF THE INVENTION

The instant invention also provides an improved polyvinyl butyral composition comprising polyvinyl butyral having a hydroxyl content of about from 15 to 30 percent, calculated as polyvinyl alcohol, and about from 20 to 55 parts per hundred of tetraethyleneglycol di-n-heptanoate of the formula:

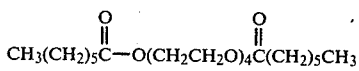

BRIEF DESCRIPTION OF THE FIGURE

The FIGURE is a graphical representation of the compatability of the compositions used in the present invention with polyvinyl butyral as compared with known plasticizers.

DETAILED DESCRIPTION OF THE INVENTION

The present invention is based on the discovery of a new composition, tetraethyleneglycol di-n-heptanoate, and its particular suitability as a plasticizer for polyvinyl butyral. The composition has the following formula:

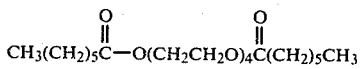

This composition can be prepared by bringing into contact tetraethyleneglycol and heptanoic acid. These compounds are believed to react according to the equation:

$$2(CH_3[CH_2]_5CO_2H) + HO(CH_2-CH_2-O)_4H \longrightarrow$$

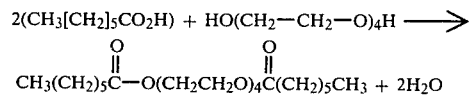 $+ 2H_2O$

While the desired product will generally be obtained in all proportions of the reactants, for maximum purity of the desired tetraethyleneglycol di-n-heptanoate at least two moles of heptanoic acid should be present for each mole of tetraethyleneglycol. Higher concentrations of the heptanoic acid, for example, up to about 2.5 moles of heptanoic acid for each mole of tetraethyleneglycol, are preferred when no additional catalyst or solvent is used in the reaction.

The reaction of heptanoic acid and tetraethyleneglycol can be carried out without a catalyst. However, the rate and ease of reaction are facilitated by the presence of a catalyst. The catalyst can, and the most basic situation, be a minor excess of the heptanoic acid itself. Other catalysts which can be used include a variety of acids, including sulfuric, formic, polyphosphoric, or p-toluenesulfonic acid and combinations of such acids. The catalyst, when used, is generally present in an amount equal to about from 0.01 to 5.0 weight percent of the total reactants.

A solvent in addition to the reactants can be used in the preparation of the tetraethyleneglycol di-n-heptanoate if desired. The solvent should be inert to the reactants and should preferably form an azeotrope with the water that is formed in the course of the reaction. Particularly satisfactory and convenient are organic solvents such as toluene, xylene, and benzene.

The preparation of the compound used in the present invention can be carried out at ambient temperatures and pressures. However, to facilitate the reaction and for ease of removal of the water formed in the reaction, the synthesis is preferably carried out at elevated temperatures of about from 50° to 300° C. Particularly satisfactory is a temperature equivalent to the boiling point of an azeotrope of water with either the heptanoic acid or solvent used in the reaction.

The water formed by the reaction of the two components is preferably removed during the course of the reaction to increase the rate of reaction, drive the reaction to completion and to monitor its progress by measurement of the quantity of water generated. The water is conveniently removed by distillation of the azeotrope of water and acid or solvent.

After completion of the reaction, the tetraethyleneglycol di-n-heptanoate can be recovered as a viscous colorless oil. If desired, residual solvent, water, catalyst or other impurities can be removed by conventional purification techniques, including filtration through anhydrous magnesium sulfate or charcoal or by vacuum distillation. The product as prepared frequently contains minor quantities, for example, up to 10 weight percent of various unreacted glycols such as ethylene, diethylene, triethylene and tetraethylene glycols; unreacted heptanoic and alpha-methylhexanoic acids as well as the mono- and di-esters thereof.

The tetraethyleneglycol di-n-heptanoate (4G7) can be incorporated into polyvinyl butyral as a plasticizer using techniques that are usually used for other plasticizers. The polyvinyl butyral and plasticizer are present in quantities which result in a compatible admixture. The quantities of plasticizer which can be added to any polyvinyl butyral vary according to the residual hydoxyl content of the polyvinyl butyral as illustrated in the FIGURE. Thus, in polyvinyl butyral having a residual hydroxyl content of 20 percent, as much as 49 parts by weight of 4G7 plasticizer can be added per each hundred parts of polyvinyl butyral. However, for polyvinyl butyral resins having 25 weight percent residual hydroxyl content, a maximum of only about 32 parts of 4G7 plasticizer can be added per hundred parts of polyvinyl butyral resin. At or below these maximum quantities or at intermediate points along the line indicating maximum compatible plasticizer level, the quantity of plasticizer can be adjusted to achieve the desired level of polymer sheet characteristics.

The plasticized polyvinyl butyral sheeting can be laminated to one or more layers of glass according to the procedures generally used in the art and illustrated, for example, in U.S. Pat. Nos. 2,293,656, 3,838,091 and 4,107,366.

The composition used in the instant invention provides outstanding plasticization of polyvinyl butyral. It has been found that the composition is compatible with polyvinyl butyral over a wide range of hydroxyl contents, and provides sheeting with excellent dimensional stability, tensile strength and stiffness at plasticizer concentrations which are lower than those required, for example, using triethyleneglycol di-2-ethylbutyrate (3GH). In addition, if desired, these compositions can be used in conjunction with triethyleneglycol di-2-ethylbutyrate. Although any proportion of the two plasticizers can be used, the beneficial effects of the instant compositions are most apparent in such mixtures when the tetraethyleneglycol di-n-heptanoate represents at least 10 weight percent of the blend of the two plasticizers.

The present invention is further illustrated in the following specific examples, in which parts and percentages are by weight unless otherwise indicated. In these examples, the following procedures and tests were used.

Refractive Index of Plasticizer: ASTM D1045 with tests run at 25° C. instead of 23° C.

PVA Viscosity: ASTM D1343 with a Hoeppler Ball-Drop Viscometer used and a temperature of 20° C. instead of 25° C.

PVB Residual Hydroxyl (Weight Percent as PVA): ASTM D1396.

Tensile Strength: ASTM D1708 with samples conditioned and run at 20.6°±0.6° C. and 23.5±2% RH instead of 23°±2° C. and 50±5% RH.

5% Secant Modulus: ASTM D882 with samples conditioned and run at 20.6°±0.6° C. and 23.5±2% RH instead of 23°±2° C. and 50±5% RH.

Flow Rate: ASTM D1238 using conditions (P) for some reported values and a temperature of 150° C. with the standard orifice and 5000 g weight for other values as noted.

Pummel Adhesion: SAE J1208.

Penetration Resistance: ANSI Z26.1 using a staircase method to determine mean break height instead of the one level test of Z26.1 as described in U.S. Pat. No. 3,718,516.

Edge Stability: ANSI Z26.1 with samples tested for four weeks instead of two.

Compatibility: Test samples are prepared by first blending 50 g of dry polyvinyl butyral flake with a plasticizer in a 0.47 l bottle on a roll mill for 2 hours. The blend is then compounded in a sigma-blade Brabender mixer for 10 minutes at 135° C. The resulting melt blend is pressed into 30-mil (0.76 mm) films using a hydraulic press with the following cycle: (1) preheat—6 minutes, 180° C., 5 psig (34.5kPa, gage), (2) mold—1.5 minutes, 180° C. and 100 psig, and (3) cool—4 minutes, 20° C. and 100 psig (689kPa, gage). A 2×3-inch (5.1×7.6 cm) film is exposed for 72 hours at 100% relative humidity and 0° C. The films are blotted between absorbent paper. The paper is then visually examined for evidence of a stain caused by exudation of the plasticizer. A compatible blend exhibits no stain.

Accelerated Edge Cloud/Edge Stability: The laminate is immersed in commercial, ammoniacal alcohol glass cleaning solution at 60° C. for 30 days. The laminate is then removed from the solution and the resulting edge cloud is measured immediately. After standing at ambient conditions for an additional 30 days, the laminate is reexamined for edge delaminations.

Tensile Creep (% Elongation): Test sheeting samples nominally 0.03 inch (0.76 mm) thick are conditioned for 4 hours at 68°±2° F. (20.0°±1.1° C.). The samples are then die cut to 0.75×4 inches (1.9×10.2 cm), marked and clipped into the test oven at 65±° C. for 1 hour. A 10 psi (69 kPa) load is applied to each specimen and the elongation measured at 30 minutes. The results are calculated by dividing the gage length after testing by the initial gage length and multiplying by 100.

Plasticizer Content by Vacuum Distillation: Molded or extruded sheeting samples are dried in an oven at 60° C. for 30–60 minutes and weighed into a test tube. An accurately tared receiver is then attached. The tube is placed in a 285°±2° C. heating block and vacuum (13 Pa minimum) is applied. After 45 minutes, the receiver containing evolved plasticizer is disconnected and weighed. The parts of plasticizer per hundred parts resin is calculated by multiplying the weight of collected plasticizer by 100 and dividing by the difference between the original sample weight minus the weight plasticizer.

EXAMPLES 1–15 & COMPARATIVE EXAMPLES A-R

Into a 1000 ml three-necked flask fitted with a Dean-Stark trap, condenser and thermometer was added 286.3 g (2.2 moles) of heptanoic acid, 185.3 g (1.0 mole) of tetraethyleneglycol and 100 ml of toluene. To this solution was added 0.2 ml of formic acid and 1.0 ml of sulfuric acid as catalyst.

The mixture was heated to reflux and water removed as the toluene-water azeotrope. The reaction was continued until the stoichiometric amount of water was removed.

Remaining acid was neutralized by adding sodium bicarbonate. The mixture was then filtered through anhydrous magnesium sulfate and distilled under vacuum, b.p. 199° C. (6.6 Pa).

Purification of the vacuum distillate afforded a product which was characterized by the following elemental analysis:

C: 63.39%, H: 10.03%, O: 26.34% (theoretical: C: 63.12%, H: 10.11%, O: 26.76%). The elemental, nuclear magnetic resonance and infrared spectral analyses were consistent with tetraethyleneglycol di-n-heptanoate (4G7) of the formula $C_{22}H_{42}O_7$.

In Examples 1-15, the resulting tetraethyleneglycol di-n-heptanoate (4G7) was blended at various levels with polyvinyl butyral having hydroxyl contents as indicated in Table I. The liquid plasticizer was blended with dried polyvinyl butyral flake and the resulting blend formed into sheeting. The resulting sheeting was tested for compatibility and the results indicated in Table I and graphically presented in the FIGURE.

In comparative examples A to I, the general procedure of Examples 1-15 was repeated, except that triethyleneglycol di-2-ethylbutyrate (3GH) was used as a plasticizer instead of 4G7. The results are summarized in Table I and the FIGURE.

In comparative examples J to R, the general procedure of Examples 1-15 was repeated except that triethyleneglycol di-n-heptanoate (3G7) was used instead of the plasticizer of the present invention. The results are summarized in Table I and the FIGURE.

TABLE I

| Example No. | PVB Hydroxyl, % | Level, PHR | Compatibility |
|---|---|---|---|
| 1 | 21.0 | 44.0 | C |
| 2 | 21.0 | 46.3 | C |
| 3 | 21.0 | 47.5 | I |
| 4 | 21.7 | 41.7 | C |
| 5 | 21.7 | 44.3 | C |
| 6 | 21.7 | 46.1 | I |
| 7 | 22.0 | 36.2 | C |
| 8 | 22.0 | 39.0 | C |
| 9 | 22.0 | 40.1 | I |
| 10 | 22.0 | 41.5 | I |
| 11 | 22.9 | 34.3 | C |
| 12 | 22.9 | 38.6 | I |
| 13 | 24.8 | 32.9 | C |
| 14 | 24.8 | 35.1 | I |
| 15 | 20.5 | 48.8 | C |
| A | 21.0 | 48.5 | C |
| B | 21.0 | 49.5 | C |
| C | 21.0 | 51.7 | I |
| D | 23.3 | 37.7 | C |
| E | 23.3 | 41.3 | I |
| F | 23.3 | 42.2 | I |
| G | 24.8 | 34.7 | C |
| H | 24.8 | 37.7 | I |
| I | 24.8 | 40.0 | I |
| J | 20.5 | 42.9 | C |
| K | 20.5 | 44.1 | I |
| L | 20.5 | 45.8 | I |
| M | 21.0 | 41.0 | C |
| N | 21.0 | 42.1 | I |
| O | 22.0 | 33.0 | C |
| P | 22.0 | 35.7 | I |
| Q | 22.9 | 30.4 | C |
| R | 22.9 | 33.2 | I |

EXAMPLES 16 & COMPARATIVE EXAMPLES S & T

In Examples 16 and Comparative Examples S & T, the general procedure of Examples 1-15 was repeated, using 4G7, 3GH and 3G7 as plasticizers, respectively. Polyvinyl butyral having a hydroxyl content of 23.3 was used for these examples. The resulting plasticized PVB sheets were evaluated and the results summarized in Table II.

TABLE II

| | Examples | | |
|---|---|---|---|
| Property | 16<br>4G7 | S<br>3GH | T<br>3G7 |
| PVB Residual Hydroxyl, % | 23.3 | 23.3 | 23.3 |
| PVA Viscosity, cp | 24.8 | 24.8 | 24.8 |
| Plasticizer, phr | 36.1 | 36.8 | 35.8 |
| Flow Rate, g/10 minutes at 190° C. | 11.2 | 13.6 | 11.0 |
| Tensile Strength, (MPa) | 28.8 | 28.5 | 29.1 |
| 5% Secant Modulus, (MPa) | 7.0 | 10.5 | 6.4 |
| Tensile Creep, % | 31.6 | 34.7 | 31.6 |
| Compatibility | C | C | I |

EXAMPLE 17 AND COMPARATIVE EXAMPLES U & V

Commercial samples of plasticized PVB having hydroxyl and plasticizer contents as shown in Table III were tested. The hydroxyl and plasticizer contents of the commercial samples are considered to be the optimum. The plasticized sheetings samples were evaluated and the results were summarized in Table III.

TABLE III

| | Examples | | |
|---|---|---|---|
| Property | 17<br>4G7 | U<br>3GH | V<br>3G7 |
| PVB Residual Hydroxyl, % | 23.1 | 23.2 | 20.8 |
| Plasticizer, phr | 35.6 | 44.0 | 38.0 |
| Flow Rate, g/10 minutes at 150° C. | 1.9 | 1.9 | 1.8 |
| Tensile Strength, (MPa) | 28.9 | 27.1 | 30.3 |
| 5% Secant Modulus, (MPa) | 6.1 | 4.3 | 3.5 |
| Tensile Creep, % | 23.3 | 38.9 | 46.8 |
| Compatibility | C | C | C |

The plasticized sheeting of the present invention exhibits superior dimensional stability as shown by lower creep and higher modulus, while maintaining the tensile strength and compatibility that is necessary for lamination with glass.

EXAMPLE 18 AND COMPARATIVE EXAMPLES W & X

The general procedures of Examples 1-15 and 17 and Comparative Examples U & V were repeated, except that the plasticized polyvinyl butyral sheeting was laminated between two layers of glass using techniques conventional in the preparation of laminated safety glass. The laminates were prepared by placing 30-mil film between two pieces of 12×12×0.1-inch (30.5×30.5×0.25 cm) glass, and treating with the following heat and pressure cycle: (1) 1 minute at 200° C. then press between nip rolls, (2) 3 minutes at 200° C. then press again between nip rolls, and (3) 9 minutes at 135° C. and 225 psig (1.55MPa, gage) in an oil autoclave. The resulting samples were tested and the results summarized in the following Table IV.

TABLE IV

| | Examples | | |
|---|---|---|---|
| Property | 18<br>4G7 | W<br>3GH | X<br>3G7 |
| PVB Residual Hydroxyl, % | 23.0 | 23.2 | 20.8 |
| Plasticizer, phr | 35.2 | 44.0 | 38.0 |
| Alkalinity Titer, cc | 167.1 | 130.0 | 192.0 |
| Interlayer Thickness, mils (mm) | 31.4<br>(0.80) | 30.4<br>(0.77) | 29.8<br>(0.76) |
| Moisture, % | 0.55 | 0.42 | 0.43 |
| Penetration Resistance (Mean Break Height), Ft (m) | 20.0<br>(6.10) | 17.3<br>(5.27) | 18.3<br>(5.58) |
| Pummel Adhesion | 3 | 2 | 2 |
| Humidity Test (4-week) | | | |
| Edge Cloud, 64th in (mm) | 11<br>(4.4) | 24<br>(9.5) | 20<br>(7.9) |
| Edge Stability, let-goes | 0 | 0 | 0 |
| Accelerated "Windex" Test - 4 week | | | |

TABLE IV-continued

| Property | Examples 18 4G7 | W 3GH | X 3G7 |
|---|---|---|---|
| Edge Cloud, 64th in (mm) | 30.5 (12.1) | 46 (18.3) | — |

The sheeting of the present invention, plasticized with 4G7, exhibits superior mechanical properties as well as edge cloud resistance.

EXAMPLES 19 & 20 AND COMPARATIVE EXAMPLE Y

The general procedure of Example 1-15 was repeated, except that blends of 3GH and 4G7 were used in Examples 19 & 20. The resulting films were tested, and the results were summarized in the following Table V.

TABLE V

| Property | Example 19 | Example 20 | Comparative Example Y |
|---|---|---|---|
| Total Plasticizer, phr | 39.3 | 36.3 | 43.4 |
| 3GH, % of total above | 34.8 | 44.6 | 100 |
| 4G7, % of total above | 65.2 | 55.4 | — |
| Tensile Strength, psi (MPa) | 4299 (29.6) | 4506 (31.1) | 3790 (26.1) |
| 5% Secant Modulus, psi (MPa) | 864 (6.0) | 890 (6.1) | 595 (4.1) |
| Tensile Creep, % | 46.8 | 45.7 | 30.0 |
| Compatability | C | C | C |

I claim:

1. A plastic composition comprising polyvinyl butyral and, in compatible admixture therewith, about from 20 to 55 parts per hundred of polyvinyl butyral of a plasticizer consisting essentially of tetraethyleneglycol di-n-heptanoate of the general formula:

2. A composition of claim 1 wherein the polyvinyl butyral has a hydroxyl content of about from 15 to 30 percent calculated as polyvinyl alcohol.

3. A composition of claim 1 wherein the polyvinyl butyral has a hydroxyl content of about from 20 to 25 weight percent, calculated as polyvinyl alcohol.

4. A composition of claim 1 wherein the tetraethyleneglycol di-n-heptanoate is present in a quantity of about 30 to 45 parts per hundred of polyvinyl butyral.

5. A composition of claim 1 wherein the plasticizer comprises a mixture of tetraethyleneglycol di-n-heptanoate and triethyleneglycol di-2-ethylbutyrate.

* * * * *